United States Patent
Zyarko et al.

(10) Patent No.: US 6,920,441 B2
(45) Date of Patent: Jul. 19, 2005

(54) METHOD AND APPARATUS FOR BUILDING COMMUNICATION BETWEEN AGENT DESKTOP SCRIPTING APPLICATIONS AND AN OUTBOUND CALL SOFTWARE SUITE WITHIN A TELECOMMUNICATIONS CENTER

(75) Inventors: Vadim Zyarko, Walnut Creek, CA (US); Oleksiy Kolomoyskyy, Moraga, CA (US); Stanislav Zgardovski, Walnut Creek, CA (US)

(73) Assignee: Genesys Telecommunications Laboratories, Inc., San Franciso, CA (US)

( * ) Notice: Subject to any disclaimer, the term of this patent is extended or adjusted under 35 U.S.C. 154(b) by 776 days.

(21) Appl. No.: 09/998,767

(22) Filed: Nov. 29, 2001

(65) Prior Publication Data

US 2003/0115257 A1 Jun. 19, 2003

(51) Int. Cl.[7] .................................................. G06N 5/00
(52) U.S. Cl. ...................... 706/45; 345/157; 379/265.09
(58) Field of Search ........................... 706/45; 345/157; 379/265.09

(56) References Cited

U.S. PATENT DOCUMENTS

| | | | |
|---|---|---|---|
| 5,848,143 A | * 12/1998 | Andrews et al. ....... 379/265.09 |
| 5,878,130 A | * 3/1999 | Andrews et al. ....... 379/265.09 |
| 6,005,549 A | * 12/1999 | Forest ......................... 345/157 |
| 6,160,536 A | * 12/2000 | Forest ......................... 345/157 |
| 6,333,928 B1 | 12/2001 | Schaal et al. |
| 6,477,434 B1 | 11/2002 | Wewalaarachchi et al. |
| 2002/0032809 A1 | 3/2002 | Bateman et al. |
| 2002/0064149 A1 | 5/2002 | Elliot et al. |
| 2002/0129094 A1 | 9/2002 | Reisman |

* cited by examiner

Primary Examiner—Wilbert L. Starks, Jr.
(74) Attorney, Agent, or Firm—Donald R. Boys; Central Coast Patent Agency, Inc.

(57) ABSTRACT

A dynamic data exchange (DDE) gateway for formatting and forwarding commands, requests, and data between separate software suites operating under disparate protocols within a communication center includes a DDE application for mapping data of disparate protocols to a common set of data topics, data items, and data commands, and a set of software controls for interface with the DDE application the controls used to create and maintain the common set of data topics, data items, and data commands. The gateway is characterized in that an agent of the communication center operating a computerized workstation invokes a DDE-enabled scripting application containing a set of data topics, data items, and data commands, the set mappable to the common set of DDE data topics, data items, and data commands such that interaction through the scripting application enables dynamic data exchange with a CTI telephony suite having a set of data topics, data items, and data commands that are also mappable to the common set of DDE data topics, data items, and data commands.

25 Claims, 5 Drawing Sheets

DDE Command Topics

| GenTInterface DDE topic | GenOBInterface DDE topic |
| --- | --- |
| Commands:<br>TAgentLogin ()<br>TRegisterDN ()<br>TSetActiveDN ()<br>TAgentLogout ()<br>TAgentReady ()<br>TAgentNotReady ()<br>TAgentBusyOn ()<br>TAgentBusyOff()<br>TMakeCall ()<br>TAnswerCall ()<br>TReleaseCall ()<br>TTransfer ()<br>TInitTransfer ()<br>TCompleteTransfer ()<br>TInitConference ()<br>TCompleteConference<br>TSingleStepConference ()<br>TDeleteFromConference ()<br>THoldCall ()<br>TRetrieveCall ()<br>TAttachUserData ()<br>TUpdateUserData ()<br>TSetUserData ()<br>TDeleteAllUserData ()<br>TDeletePair ()<br><br>Items:<br>TAgentState<br>TRequestState<br>TRequestDone<br>TAgentStateStr<br>TRequestStateStr | Commands:<br>PreviewModeStart ()<br>PreviewModeOver ()<br>PreviewRecordRequest ()<br>DoNotCallRecord ()<br>DoNotCallAllChain ()<br>DoNotCallNumber ()<br>AddRecord ()<br>UpdateCallCompletionStats ()<br>RecordProcessed ()<br>RecordProcessedAll()<br>RecordReject ()<br>RecordRejectAll ()<br>RecordCancel ()<br>RecordCancelByNumber ()<br>GetRecordByHandle ()<br>RequestRecordCancelHandle ()<br>RecordReshedule ()<br>ScheduledRecordReshedule ()<br>DoNotCallRecordHandle ()<br>ChainedRecordRequest ()<br><br>Items:<br>OBRequestState<br>OBRequestDone<br>OBRequestStateStr<br>OBCampaignState<br>OBCampaignStateStr<br>OBCallbacksNum |

*Fig. 4*

DDE Data topics

CallRecord DDE topic

Items:
GSW_RECORD_HANDLE
GSW_CAMPAIGN_NAME
GSW_CALLING_LIST
GSW_CALL_RESULT
..............

GenGeneral DDE topic

Items:
ErrorMsg
CallRecord

InboundCallData DDE topic

Items:
Represent key-value pairs from Call
Attached Data

TEventAttributes DDE topic

Items:
AgentID
ANI
CallID
CallState
CallType

*Fig. 5*

METHOD AND APPARATUS FOR BUILDING COMMUNICATION BETWEEN AGENT DESKTOP SCRIPTING APPLICATIONS AND AN OUTBOUND CALL SOFTWARE SUITE WITHIN A TELECOMMUNICATIONS CENTER

FIELD OF THE INVENTION

The present invention is in the field of telecommunication encompassing all existing sorts of interaction multimedia technology, and pertains more particularly to a method and apparatus for providing communications between agent desktop applications and a call center software suite, such as an outbound call center suite, by utilizing dynamic data exchange functionality in the agent's desktop.

BACKGROUND OF THE INVENTION

In the field of telephony communication there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known generally in the art as computer-telephony integration (CTI). Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center are commonly referred to as customer premises equipment (CPE). It is the CTI processor and application software in such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations are usually equipped with computer terminals such as personal computer/video display units (PC/VDU) so that agents manning such stations may have access to stored data as well as being linked to incoming callers by telephone equipment. Such stations may be interconnected through the PC VDU by a local area network (LAN). One or more data or transaction servers may also be connected to the LAN that interconnects agent stations. The LAN is, in turn, typically connected to the CTI processor, which is connected to the call switching apparatus of the call center.

In recent years, advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multimedia telephone system known in the art by several names. In this new systemology, telephone calls are simulated by multimedia computer equipment, and data, such as audio data, is transmitted over data networks as discrete data packets. In this system a broad term used to describe such computer-simulated telephony is Data Network Telephony (DNT).

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

In addition to IPNT calls, a DNT center may also share other forms of media with customers accessing the system through their computers. E-mails, video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving connection-oriented switched telephony (COST) calls and converting them to a digital DNT format for management within the communication center environment. The term communication center will replace the term call center hereinafter in this specification in deference to multimedia capabilities.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

It is important in a communication center environment that different types of applications are able to directly transact with each other for the purpose of efficient and seamless interoperability between customer and agent. This fact must be true in an agent desktop as well as over a network. One of the challenges facing a communication center, for example, is how to provide efficient agent scripting tools during an automated outbound call campaign. The agent involved in such a campaign must have reportable status for routing purposes; access to various communication center resources prior to and during a call connection; and knowledge of contact and call records.

A method of interprocess communication known in the art as Dynamic Data Exchange (DDE) is a feature of Windows® operating system (O/S) that allows two programs to share data or send commands directly to each other. DDE can be thought of as a direct conversation between two application programs. In most cases, one application is providing some form of data (such as either text or graphics) to another application. The application that is the source of the data is called the "server" and the application that is receiving the data is called the "client". The process works through a shared memory and a software module termed a software wedge that enables data synchronization between a client and server application by DDE linking in real time. Generally a client application initiates a session to receive data from a server application.

In Windows®, DDE is used for data sharing and command application between word processing applications and data source applications such as with a spread sheet program and a database program. An extension to DDE known in the art as Net DDE allows two programs, each residing in separate computers, to transact over a data network.

In current art telephony applications, software developers create proprietary scripting applications for agent's desktops that interact with communication center telephony routing and communication software. These solutions are typically protocol-specific and are not easily integrated with other, and competing applications of different protocols without extensive re-engineering of software. It is desirable, however, that communication centers be able to build agent scripting applications and interaction tools using existing products wherein different command and state protocols are automatically mapped to one other, providing thereby communication in real time, and enabling seamless transaction between participating applications.

A good example of a communication center situation where desktop functionality must interact seamlessly with center telephony software is an outbound call and connect campaign. A large outbound call campaign initiates automated calls to destinations on a target list, and upon connection, routes connected calls among a plurality of agents operating desktop applications. As a result, each desktop application must have communication with a transaction routing interface in order to receive calls an also to receive call information about the incoming calls.

Therefore, what is clearly needed is a method and apparatus for providing seamless agent scripting and interaction capability with an automated communication-center call campaign, wherein any DDE-enabled application may be used as a client application and wherein the DDE functionality is incorporated as an agent-specific gateway, a multiplicity of which may simultaneously interact with a central transaction system.

SUMMARY OF THE INVENTION

In a preferred embodiment of the invention a dynamic data exchange (DDE) gateway for formatting and forwarding commands, requests, and data between separate software suites operating under disparate protocols within a communication center is provided, comprising a DDE application for mapping data of disparate protocols to a common set of data topics, data items, and data commands, and a set of software controls for interface with the DDE application, the controls used to create and maintain the common set of data topics, data items, and data commands. The gateway is characterized in that an agent of the communication center operating a computerized workstation invokes a DDE-enabled scripting application containing a set of data topics, data items, and data commands, the set mappable to the common set of DDE data topics, data items, and data commands such that interaction through the scripting application enables dynamic data exchange with a CTI telephony suite having a set of data topics, data items, and data commands that are also mappable to the common set of DDE data topics, data items, and data commands.

In a preferred embodiment of the invention the set of controls for creating and maintaining the DDE data topics, data items, and data commands are ActiveX controls. Also in a preferred embodiment the separate software suites enable CTI telephony interaction between an agent and a client over a PBX network.

In some embodiments the separate software suites enable IP telephone interaction between an agent and a client over an IP network, and in some other embodiments the separate software suites enable both IP and PBX interaction.

In an enhanced embodiment the further comprises an application interpreter for accepting and interpreting an application served from a remote network source, and in some of these embodiments the served application is an agent scripting application. The DDE-enabled scripting application can be personalized to the invoking agent, and can be shared by a plurality of invoking agents.

In another preferred embodiment of the invention a DDE-enabled communication and routing system for connecting agents of a communication center with center clients is provided, comprising a DDE application for mapping data of disparate protocols to a common set of data topics, data items, and data commands, a set of software controls for interface with the DDE application the controls used to create and maintain the common set of data topics, data items, and data commands, an agent-scripting application for interface with the DDE application, and a telephony application for interface with the DDE application and for making contact with and routing telephony events to appropriate agents logged into the system.

In some embodiments of the system the set of controls for creating and maintaining the DDE data topics, data items, and data commands are ActiveX controls, and in some embodiments the outbound telephony application makes contact with clients over a PBX network. In further embodiments the outbound telephoning application makes contact with clients over an IP network, and in still further embodiments the outbound telephone application makes contact with clients over a PBX network and an IP network.

In some embodiments there is an application interpreter for accepting and interpreting an application served from a remote network source, and in some others the served application is an agent scripting application. The agent scripting application may be personalized to the invoking agent, may be shared by a plurality of invoking agents.

In another aspect of the invention a method for practicing dynamic data exchange between two disparate software systems within a communication center is provided, comprising the steps of (a) creating a set of DDE data topics, data items, and data commands that are map able to data topics, data items, and data commands of the two disparate software systems; (b) receiving data from one of the disparate software systems and mapping the data to the common set of data topics, data items, and data commands; and (c) using the common set of data topics, data items, and data commands, mapping the received data to the set of data topics, data items, and data commands of the other disparate software system.

In some embodiments off the method, in step (a), the set of DDE data topics, data items, and data commands is created using ActiveX tools. In some other embodiments, in step (b), the data is received from an agent-scripting application. In still other embodiments, in step (b), the data is received from an outbound telephony application. The data mapping in some preferred embodiments is an automated and transparent process, and in step (a) creating is performed by any third party on behalf of a target agent or agents.

In embodiments of the invention taught in enabling detail below, for the first time a system is provided in which a dynamic data exchange (DDE) gateway for formatting and forwarding commands, requests, and data between separate software suites operates under disparate protocols within a communication center.

DESCRIPTION OF THE PREFERRED EMBODIMENTS

In a preferred embodiment of the present invention, a DDE-compatible system is provided to link agent-desktop applications which are DDE-enabled to a common software server application representing an outbound telephony campaign application. The descriptions below, describing preferred embodiments of the invention, insofar as the descriptions are related to outbound call campaigns and related software, are meant to be exemplary, and do not limit the invention to outbound call campaigns or software.

Figure 1:
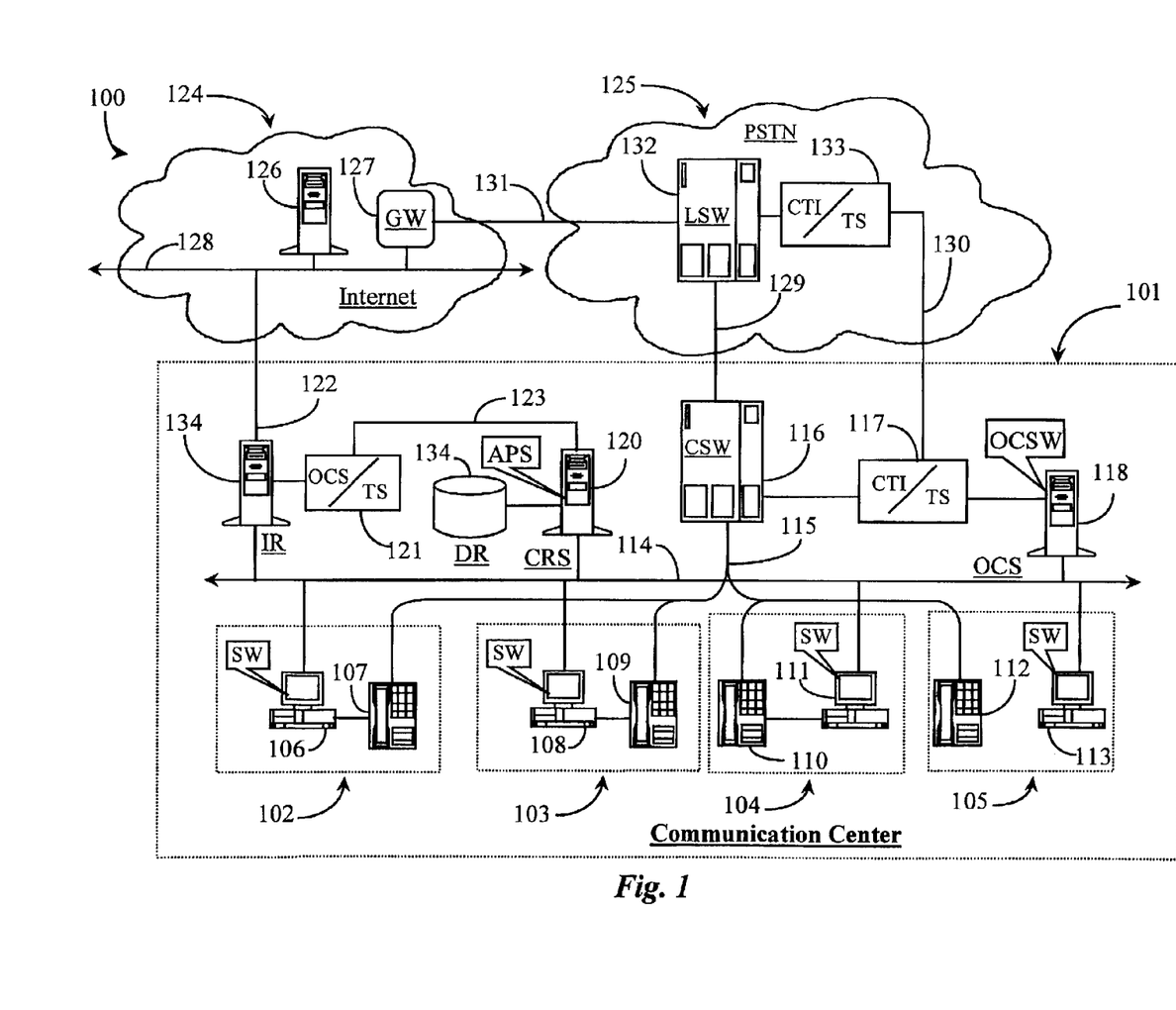
FIG. 1 is an overview of a communication network wherein communication between agent desktop applications and an outbound telephony suite is practiced using DDE according to an embodiment of the present invention.

FIG. 1 is an overview of a communication network 100 wherein communication between agent desktop applications (SW) and an outbound call software (OCSW) application is practiced using DDE according to an embodiment of the present invention.

Network 100 comprises a PSTN network 125, an Internet network 124, and a communication center 101. PSTN 125 may instead be a private telephone network or a corporate telephone network. The inventor chooses to illustrate PSTN 125 as a preferred example of a connected telephone network because of a high public access characteristic. PSTN 125 contains all of the equipment and connections to perform public switched telephony as is known in the art.

Internet network 124 represents a preferred data packet network for practicing the invention in an IPNT version, which is described further below. Network 124 may be a corporate or private wide area network WAN instead of the well-known Internet network. The inventor chooses the Internet network as a preferred example because of a high public-access characteristic. Presence of a connected data packet network, in this case Internet 124, is not required to practice the present invention.

Communication center 101 represents a state-of-the-art communication center as is known to the inventor. Communication center 101 is dually capable, meaning that it can handle transactions from both PSTN 125 and from Internet 124. Communication network 100 represents an optimum network for customer service using a variety of IP and COST communication methods. COST is an acronym for connection-oriented, switched telephony, which is the conventional, as opposed to DNT, telephone system.

A local telephony switch (LSW) 132 is illustrated within PSTN 132 and represents a local call switch with respect to communication center 101. Switch 132 is adapted, in this example, as a private branch exchange (PBX) telephony switch. However, switch 132 may be adapted as an automatic call distributor (ACD) or other known types of telephony switches. A CTI processor 133 is illustrated within PSTN 125 and has connection via a CTI link to switch 132. CTI processor 133 monitors switch and transaction activity and provides intelligence to switch 132, wherein such intelligence may be controlled from within communication center 101. Processor 133 has an instance of telephony transaction server software (TS) implemented therein and adapted to provide intelligent routing functions at the level of PSTN 125 and controlled from within center 101.

A central telephony switch CSW 116 is illustrated within communication center 101 and is adapted as a central switch for distributing all call events within center 101 that are sourced from PSTN 125. Switch 116 is also adapted as a last routing point for all COST calls going out of center 101. Similar to the description of switch 132 above, switch 116 may be an ACD, PBX, or other known types. Central switch 116 has connection to local switch 132 by way of a telephony trunk system 129. All COST calls leaving from or arriving into center 101 are routed between switches 132 and 116 over trunk system 129.

A CTI processor 117 is illustrated within center 101 and has connection to central switch 116 by way of a CTI link. Processor 117 may be assumed to be similar if not identical to processor 133 in that it provides telephony routing intelligence by way of TS software provided for the purpose. Processor 117 within center 101 has connection to processor 133 implemented within PSTN 125 by way of a digital network 130 separate from the telephony trunk. In this way information about callers waiting at switch 132 to be routed through to switch 116 within center 101 may be forwarded to a selected agent along with or ahead of the routed call. Such data may include automated number identification (ANI), destination number identification service (DNIS), caller line ID (CLID) and other data provided by carrier services. Some caller information may be solicited by Interactive Voice Response (IVR) software (not shown) implemented within processor 133 at the PSTN level. Solicited information may include such as call reason, party requested, passwords, product codes, or any other customer input that may be deemed necessary to effectively route the call. The illustrated CTI architecture comprising processors 133, 117 and data network 130 enables intelligent agent level call routing (ALR) to be implemented within PSTN 125.

Within center 101 there are illustrated a plurality of agent workstations 102, 103, 104, and 105. Each workstation is defined in this example by a PC/VDU 106, 108, 111, and 113 respectively. Each PC/VDU 106 (station 102) through 113 (station 105) has connection to a local area network (LAN) 114 for communication and information sharing purposes. Each workstation 102–105 also has a COST-enabled and/or DNT-enabled telephone for communication purposes.

Telephones 107, 109, 111 and 112 are illustrated in this example and are associated one each with workstations 102, 103, 104, and 105 respectively. Telephones 107–113 are illustrated as having connection to CSW 116 within center 101 by internal telephone wiring 115. Telephones 107–113 are further shown in this example to have connection to respective PC/VDUs 106–113 by way of data connection. In fact, the data connections may connect the telephones to the sound card system on each PC/VDU enabling agent-control of the telephones through their computers. This architecture is known to the inventor and is not specifically required in order to practice the invention. The phone/PC connections are a convenience of use only, and telephone/computer integration may be accomplished in a number of ways known in the art.

An outbound contact server (OCS) 118 is provided within center 101 and shown to have connection to LAN 114. Server 118 is adapted as an automated system for conducting an automated outbound call campaign from within center 101. Server 118 has an instance of outbound call software (OCSW) provided therein giving the server capability for placing outbound calls and then causing successful connections to be routed as incoming calls to agents within center 101. OCSW within server 118 is adapted to operate with CTI protocol implemented at switches 116 and, in this example, 132 within the PSTN network.

Each agent workstation 102–105 within center 101 has an instance of software (SW) installed on respective PC/VDUs 106–113. SW installed at PC/VDU 106, for example, is adapted to transact with OCSW at server 118 in accordance with part of an outbound call campaign from the viewpoint of agent workstation 102. SW at each PC/VDU (106–113) functions in the capacity of an agent script application and DDE-enabled receiver of routing notification, as well as other data associated with the ongoing outbound campaign that may be pertinent to a participating agent. For example, SW installed at PC/VDUs 106–113 may request and receive pertinent call records and other information available for synchronization and display. SW instances running on PC/VDUs 106–113 use existing DDE capability built into the operating system, which in a preferred example is Windows® O/S.

A call record server CRS 120 is provided within center 101 and has connection to LAN 114. CRS 120 is adapted in this embodiment as a database application that manages current call records pertinent to one or more outbound call campaigns conducted within center 101. Such records are stored in an illustrated data repository (DR) 134 shown having a data connection to server 120. Server 120 also functions as a DDE application server (APS) enabled in the function by software of the invention. DDE applications are typically tooled for agents by an applications builder (not shown) and are served to appropriate agents at time of log-in. Call records within DR 134 accessible through server 120 are updated in real time as they occur by server 118.

As described above, DDE applications served by server 120 represent tooled applications ready for incorporation by agents of center 101 in conjunction with assigned dynamic outbound call campaigns. These described applications are agent-specific in one embodiment, meaning that when an agent logs in and receives his or her application, the records that can be retrieved thereto are pertinent to that agent's state and interaction. Thus, if more than one agent logs in to participate in an outbound campaign, each agent will retrieve his or her own call records into his or her own application. DDE applications served by server 120 are campaign-specific and may be stored and later redistributed for a repeat of a particular campaign.

CRS 120 may be configured also to serve other communication-center related data, which may be stored in DR 134 without departing from the spirit and scope of the invention. For example, DR 134 may hold contact histories, customer financial information, product information, and other useful information which may be cross-referenced to current interactions routed in the course of an outbound campaign.

The software (SW) of the present invention, which is described in enabling detail below, provides a seamless agent DDE gateway for interfacing an agent's DDE-enabled application and prevailing communication center telephony protocols.

On the IPNT side of communication center 101, there is illustrated an Internet Protocol Router (IR) 134. IR 134 is adapted to route incoming IP call events and other IP communication sourced from Internet 124 to appropriate PC/VDUs 106–113 by way of LAN 114. IR 134 has a connection to Internet 124 by way of an Internet access line 122. An Internet backbone 128 is illustrated within Internet 124 and represents all of the connections, equipment, and data lines making up the Internet as a whole. Therefore, there are no geographic limitations to the practice of the present invention. An Internet server 126 is provided within Internet 124 and is connected to backbone 128. Server 126 is configured as a contact server for IP clients doing business with center 101. A network gateway (GW) 127 is illustrated within Internet 127 and is connected to backbone 128. Gateway 127 is adapted to convert data formats of communications routed between PSTN 125 and Internet 124. Such provisions are more recently known in the art. GW 127 is connected to LSW 132 within PSTN 125 by a COST line 131.

A processor 121 is illustrated within center 101 and is connected to IR 134 by a data line. Processor 121 is adapted with an IPNT version of TS software and outbound call software (OCS). Processor 121 has access to data served by CRS 120 through a data network 123, which in this example, is separate from LAN 114. In another embodiment, processor 121 may access CRS 120 via LAN 114.

Illustration of IPNT equipment and software-equivalents to CTI/TS/OCSW is provided to show that the method and apparatus of the present invention may be practiced in a purely IPNT sense over a data packet network. However, in a preferred example, the invention is provided and practiced in a CTI/PBX communication center scenario. Because the nature of DDE, CTI, TS, and OCSW interaction is digital, reasonable modification to the SW of the invention and supporting applications is implemented to adapt the invention for IPNT use. State-of-the-art communication centers are capable of both COST and IPNT interaction, wherein intelligent routing rules apply. Such rules and procedures implemented according to existing enterprise rules are applicable in terms of capable function to both environments.

It will be apparent to one with skill in the art that communication center 101 may have many more agent workstations implemented therein without departing from the spirit and scope of the present invention. Also, there may be more types of equipment represented in such a center without departing from the spirit and scope of the present invention. The inventor intends to show only the basic components of a state-of-art center utilized to practice the invention.

Figure 2:
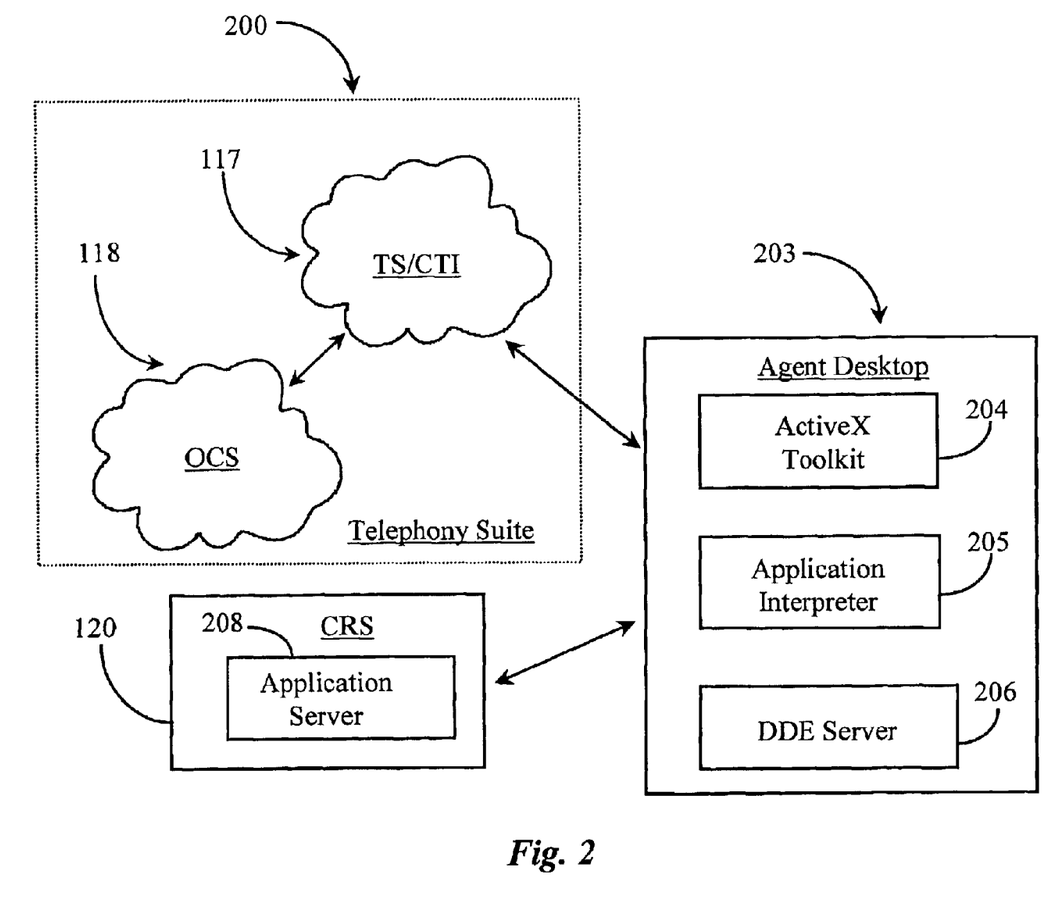
FIG. 2 is a block diagram illustrating components of a DDE communication-center system according to an embodiment of the present invention.

FIG. 2 is a block diagram illustrating components of a DDE-enabled outbound call system according to an embodiment of the present invention. The system of the invention comprises a telephony suite 200, Agent desktop application 203 and an application server 208. Software suite 200 comprises TS/CTI capability logically illustrated herein as served by OCS server 118 and TS/CTI processor 117 introduced above with respect to FIG. 1. Application server (APS) 208 is logically illustrated in this example as served by CRS 120 introduced above with respect to FIG. 1. Agent desktop 203 comprises an ActiveX toolkit 204, an application interpreter 205, and a DDE server 206.

In a preferred embodiment of the present invention the DDE-enabled system uses an agent-scripting suite known in the art as the eShare Magellan™ suite. However, the use of eShare Magellan™ as the desktop scripting application should not be considered a limitation of the invention. In other embodiments other applications that are known and are DDE-enabled can be used. For example, Microsoft Excel™, a known DDE-enabled application, may be utilized. It is noted herein that ActiveX toolkit 204 is licensed from Genesys Telecommunication® as far as the building code or blocks used to create functionality for extending a DDE Topic set. The integration of ActiveX code with the DDE interface creates a unique DDE code set that functions to map telephony entities, commands and items to Magellan topics, commands, and items. For example, TInterface as a topic implements agent telephony function (CTI, TS, and OCS). CallRecord as a topic implements outbound protocol for preview/predictive call record chains and callback record chains. OBInterface as a topic implements outbound protocol for record-related conversations to OCS. It is noted herein that the exact expression of a topic and, for that matter, an exact list of topics is not essential to the practice of the present invention. The topic representation above represents an actual example of how the three described topics are represented in one embodiment. There are other possible expression vehicles as well as possible topics that may be created.

Application interpreter 205 is a component of eShare Magellan® and is part of that application licensed for use. In some embodiments using other applications such as Excel, a separate application server is not required. Application server 208 serves executable agent scripting applications that have been built with the ActiveX tools.

Figure 4:
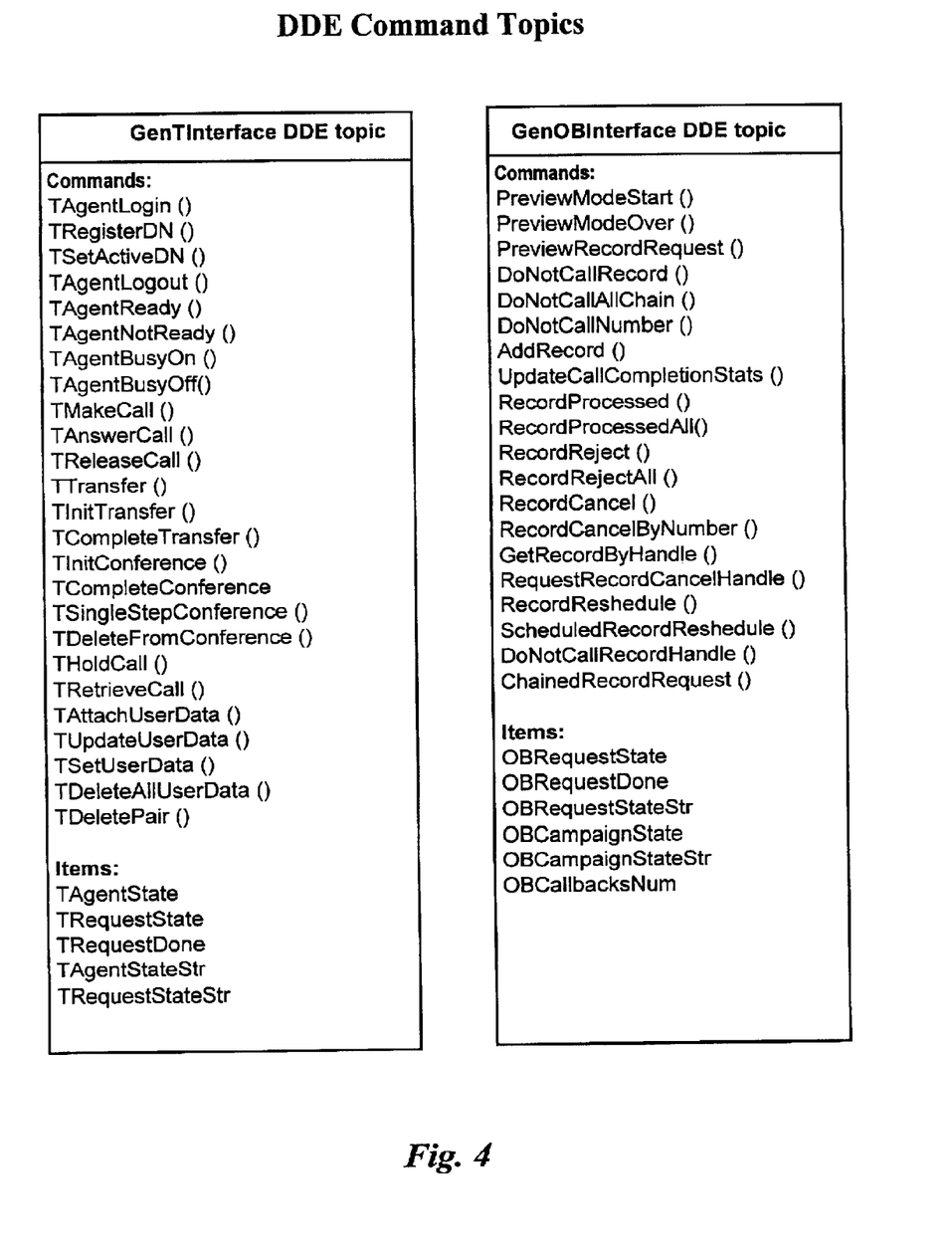
FIG. 4 illustrates tables of DDE command topics.

It is noted herein that a DDE topic includes an associated list of commands and items. In the tables illustrated as FIGS. 4 and 5, such commands and items are listed for each topic.

In the first table (left of FIG. 4) the actual commands and items for the TInterface DDE topic are listed. T corresponds to T-server routing function and protocol. The next table to the right in FIG. 4 lists the actual commands and items listed under the OBInterface DDE topic. OB refers to outbound telephony software protocol and function. Gen simply refers to the company of the inventor. It is noted herein that the unique DDE commands and items listed in both tables are mapping commands and items transacted between the appropriate conventions (T-server, CTI telephony, OCS) and Magellan function and capability.

Figure 5:
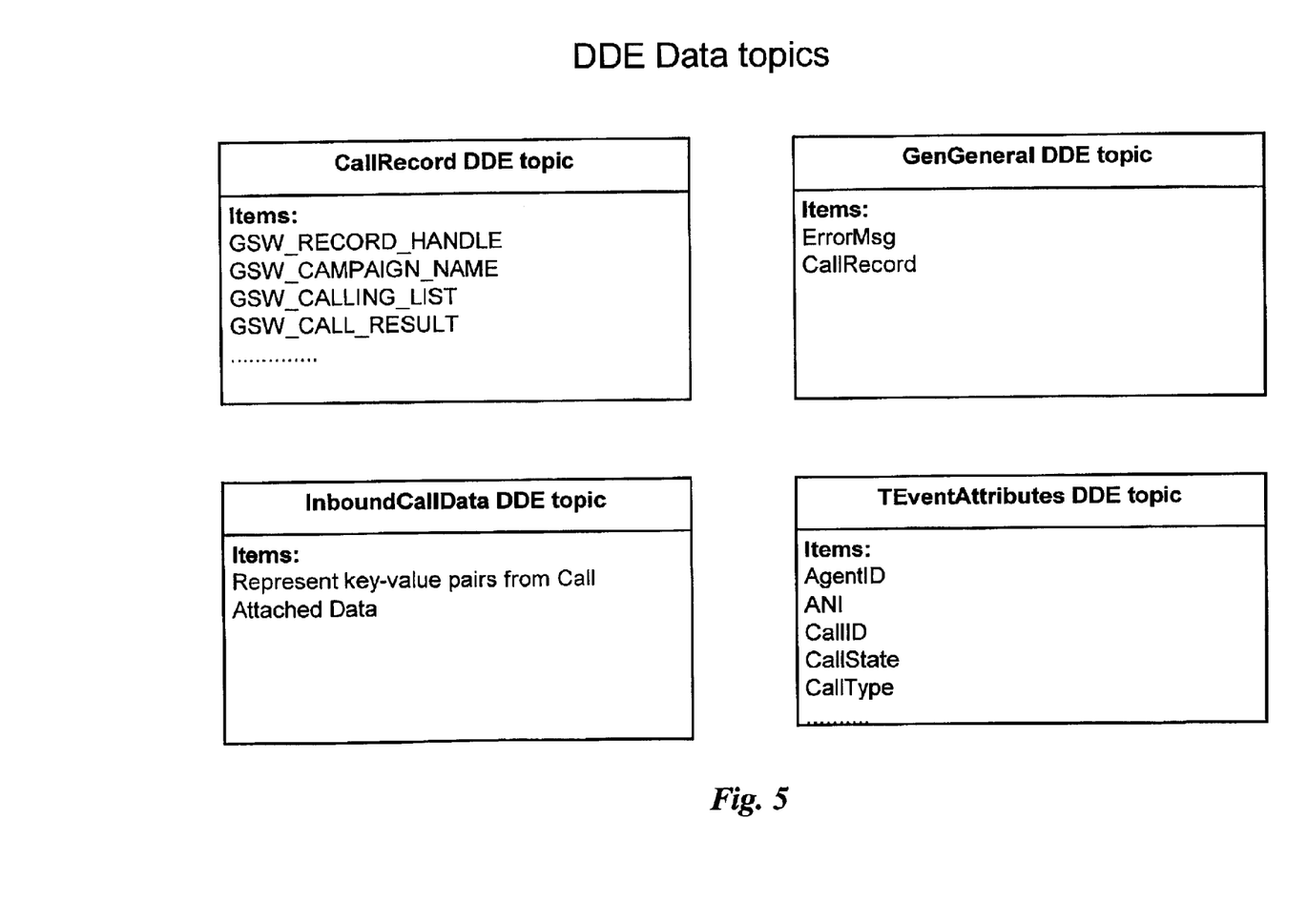
FIG. 5 illustrates tables of DDE data topics.

DDE data topics created with the use of ActiveX tools include CallRecord DDE topic as illustrated in FIG. 5. Under each DDE data topic there are data items listed. The items include RECORD_HANDLE, CAMPAIGN_NAME, CALLING_LIST, and CALL_RESULT as well as the items for all other key-value pairs from the call-attached user data. These data items represent retrievable hard data that is personal to the agent or agents responsible for his or her part of an outbound call campaign. In other words, the data items are personal to the agent.

In addition to automated agent scripts, which appear in the Megellan desktop interface during interaction, retrieved records representing call list data and call result data also appear in the Magellan interface. DDE server 206 acts as a proxy server between Magellan and Telephony suite 200. During operation, transactions are interpreted and converted into understood formats with respect to the agent's scripting application and the communication center's telephony software such that the mapping is dynamic and occurs in real time. This involves ActiveX functional modules that come into play during proxy translation of protocols using DDE commands, topics, and items.

It is noted herein that any agent scripting application may be configured to communicate through the DDE gateway of the present invention without departing from the spirit and scope of the invention. An agent desktop application is enabled for Agent Login, Agent interaction, and Agent Logout through the same interface. In a preferred implementation the agent application interfaces on one side to the unique DDE gateway, which in turn interfaces with T-server software to implement telephony function. T-server is assumed to be compatible with the outbound telephony function and any other CTI function.

In logging in to conduct an outbound call campaign, an agent executes the following command: TagentLogin (DN, DNType, Login ID, Queue). The DDE gateway converts the command into T-server protocol and forwards the command to T-server as a request to register a client. At this point an open link is established by T-server response and the correct address information is transacted along with login information. DDE server sets agent state with T-server and the agent may begin operation.

Logout procedure is similarly handled beginning with a command sent to the DDE server from the agent desktop. It is noted herein that the DDE server is also part of the agent desktop as previously described. The command is mapped at the DDE server to a T-server request for logout. During the transaction between the DDE server and T-server, the agent's state is set, the agent's desktop is unregistered and the connection is then broken.

Figure 3:
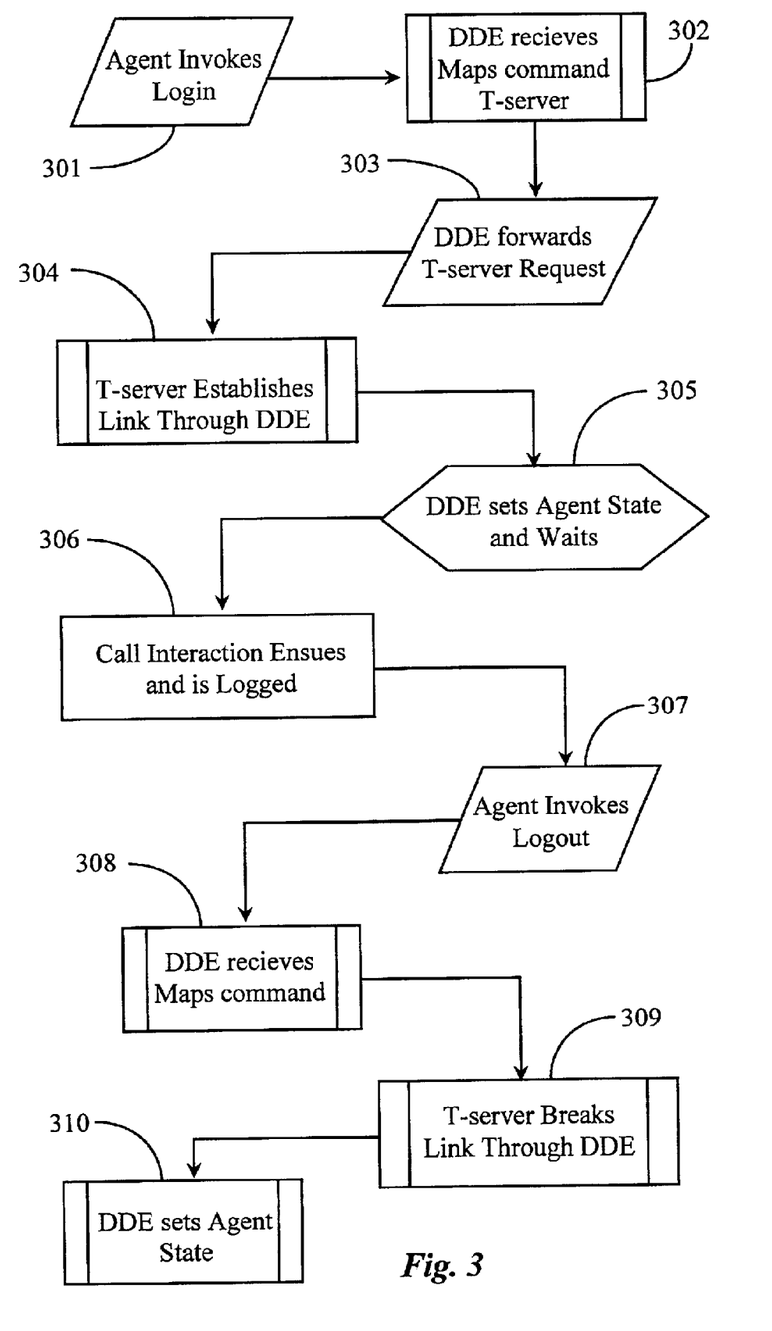
FIG. 3 is a process flow diagram illustrating basic interaction steps between an Agent application and telephony software according to on embodiment of the present invention.

FIG. 3 is a process flow diagram illustrating basic interaction steps between an agent application and telephony software according to on embodiment of the present invention. At step 301, an agent invokes a login command through his or her desktop interface. In one embodiment an application server may serve a pre-prepared agent scripting application complete with all of the attributes of an ensuing campaign. It may be assumed herein that an agent's login includes serving of an application created for an outbound call campaign as part of the login procedure. However, this should not be construed as a limitation of the present invention as login may also be executed from the point of receiving the appropriate application for the campaign.

At step 302, the DDE server receives the agent's login command and maps the command to the appropriate T-server request for agent login. At step 303, the DDE server forwards the T-server request to the T-server, which manages all telephony function. At step 304, the T-server establishes a link or connection through the DDE server, which is functioning as a proxy. Once a connection is active, the DDE server sets the prevalent agent states in step 305 and waits for further instruction. Agent states are dynamic and are reset according to most current state. States related to the level of agent availability are dynamically set by DDE server software based on agent interaction and command activation through the agents scripting application. These states are reported through T-server protocols to outbound telephony software and, in some cases to inbound routing protocols.

Step 306 is an ongoing step while the agent is logged in and actively participating in an outbound campaign. Call records pertaining to outbound connect results are logged. Call records pertaining to a callback list are also logged. This information may be automatically served to the agent during interaction or may be retrieved by request of the agent through his or her desktop application. At step 307, the agent invokes a logout command. At step 308, the DDE server receives and maps the logout request to T-server protocol equivalent.

At step 309, the T-server receives the logout request from the DDE server and processes the command ultimately breaking the connection between the T-server and the DDE server. At step 310, the DDE server sets the agent's new state and the agent may close his or her desktop application. At this point the agent is no longer working outbound telephony and may resume taking inbound calls or performing other duties.

It will be apparent to one with skill in the art that there will be many more subroutines associated with the basic process illustrated herein without departing from the spirit and scope of the present invention. The interaction between the agent's desktop application and the outbound contact center through the DDE proxy follows a TCP/IP request and response protocol including appropriate error procedures and server timeout procedures. In one embodiment of the present invention, a group of agents may share a single campaign, such that when one agent is unavailable for an extended period, or must logout before his or her responsibilities of the campaign have been fulfilled, such responsibilities may be dynamically allocated through routing protocols to the other responsible agents working the campaign. Such functionality is not limited simply to call records and callback records, but may also be integrated with routing rules in dynamic inbound routing of successful outbound connections.

The method and apparatus of the present invention provides communication center administers with the capability of building dynamic applications for virtually any purpose, including but not limited to outbound calling, wherein such applications may interact with the same telephony protocols regardless of the application protocols used so long as the applications are DDE enabled. Such flexibility eliminates requirements of proprietary desktop implementations for outbound automated telephony function. The ActiveX toolkit can be used to provide suitable interface between any DDE enabled application and prevalent telephony software and routing protocols.

The method and apparatus of the present invention should be afforded the broadest scope under examination in light of many possible embodiments and breadth of the invention. The spirit and scope of the present invention should be limited only be the claims that follow.

What is claimed is:

1. A dynamic data exchange (DDE) gateway for formatting and forwarding commands, requests, and data between separate software suites operating under disparate protocols within a communication center comprising:
    a DDE application for mapping data of disparate protocols to a common set of data topics, data items, and data commands; and
    a set of software controls for interface with the DDE application, the controls used to create and maintain the common set of data topics, data items, and data commands;
    characterized in that an agent of the communication center operating a computerized workstation invokes a DDE-enabled scripting application containing a set of data topics, data items, and data commands, the set mappable to the common set of DDE data topics, data items, and data commands such that interaction through the scripting application enables dynamic data exchange with a CTI telephony suite having a set of data topics, data items, and data commands that are also mappable to the common set of DDE data topics, data items, and data commands.

2. The DDE gateway of claim 1 wherein the set of controls for creating and maintaining the DDE data topics, data items, and data commands are ActiveX controls.

3. The DDE gateway of claim 1 wherein the separate software suites enable CTI telephony interaction between an agent and a client over a PBX network.

4. The DDE gateway of claim 1 wherein the separate software suites enable IP telephone interaction between an agent and a client over an IP network.

5. The DDE gateway of claim 1 wherein the separate software suites enable both IP and PBX interaction.

6. The DDE gateway of claim 1 further comprising an application interpreter for accepting and interpreting an application served from a remote network source.

7. The DDE gateway of claim 6 wherein the served application is an agent scripting application.

8. The DDE gateway of claim 1 wherein the DDE-enabled scripting application is personalized to the invoking agent.

9. The DDE gateway of claim 1 wherein the DDE-enabled scripting application is shared by a plurality of invoking agents.

10. A DDE-enabled communication and routing system for connecting agents of a communication center with center clients comprising:
    a DDE application for mapping data of disparate protocols to a common set of data topics, data items, and data commands;
    a set of software controls for interface with the DDE application the controls used to create and maintain the common set of data topics, data items, and data commands;
    an agent-scripting application for interface with the DDE application; and
    a telephony application for interface with the DDE application and for making contact with and routing telephony events to appropriate agents logged into the system.

11. The DDE-enabled communication and routing system of claim 10 wherein the set of controls for creating and maintaining the DDE data topics, data items, and data commands are ActiveX controls.

12. The DDE-enabled communication and routing system of claim 10 wherein the outbound telephony application makes contact with clients over a PBX network.

13. The DDE-enabled communication and routing system of claim 10 wherein the outbound telephoning application makes contact with clients over an IP network.

14. The DDE-enabled communication and routing system of claim 10 wherein the outbound telephone application makes contact with clients over a PBX network and an IP network.

15. The DDE-enabled communication and routing system of claim 10 further comprising an application interpreter for accepting and interpreting an application served from a remote network source.

16. The DDE-enabled communication and routing system of claim 15 wherein the served application is an agent scripting application.

17. The DDE-enabled communication and routing system of claim 15 wherein the agent scripting application is personalized to the invoking agent.

18. The DDE-enabled communication and routing system of claim 15 wherein the agent scripting application is shared by a plurality of invoking agents.

19. A method for practicing dynamic data exchange between two disparate software systems within a communication center comprising the steps of:
    (a) creating a set of DDE data topics, data items, and data commands that are map able to data topics, data items, and data commands of the two disparate software systems;

(b) receiving data from one of the disparate software systems and mapping the data to the common set of data topics, data items, and data commands; and (c) using the common set of data topics, data items, and data commands, mapping the received data to the set of data topics, data items, and data commands of the other disparate software system.

20. The method of claim 19 wherein in step (a) the set of DDE data topics, data items, and data commands is created using ActiveX tools.

21. The method of claim 19 wherein in step (b) the data is received from an agent-scripting application.

22. The method of claim 19 wherein in step (b) the data is received from an outbound telephony application.

23. The method of claim 19 wherein in step (b) the data mapping is an automated and transparent process.

24. The method of claim 19 wherein in step (c) the data mapping is an automated and transparent process.

25. The method of claim 19 wherein in step (a) creating is performed by any third party on behalf of a target agent or agents.

* * * * *